United States Patent Office 3,072,710
Patented Jan. 8, 1963

3,072,710
PROCESS FOR THE PREPARATION
OF CARBAMATES
Minerva C. Flores, Philadelphia, and Bernard Loev, Broomall, Pa., assignors to Smith Kline & French Laboratories, Philadelphia, Pa., a corporation of Pennsylvania
No Drawing. Filed Dec. 15, 1960, Ser. No. 75,904
6 Claims. (Cl. 260—482)

This invention relates to a new and advantageous process for the preparation of carbamates from hydroxy and mercapto containing compounds.

Carbamates have been prepared heretofore by prior art methods which are inconvenient, time consuming and give low yields of carbamates. A standard procedure for the preparation of a carbamate is by reaction of an alcohol with phosgene and then with liquid ammonia. The use of either of these reagents obviously involves inconvenient laboratory procedures and techniques. Other known procedures require the reaction of the alcohol with an alkali metal cyanate and an acid over a long period of time, for example several days.

The process of this invention solves a difficult problem of the prior art by providing a greatly simplified procedure, a shortened reaction time and increased yields of carbamates. Up to two fold increase in yields are realized by the process of this invention. The increased yields are of particular importance in the preparation of carbamates of tertiary alcohols and thiols which, by methods known heretofore, are prepared with difficulty and in low yields.

The process of this invention provides for an advantageous preparation of carbamates having therapeutic activity, for example tranquilizers such as meprobamate and emylcamate. In addition carbamates having hypnotic and sedative activity such as isoamyl carbamate, methylpropylcarbinyl carbamate, t-amyl carbamate, dichloroisopropyl carbamate and trichloroethyl carbamate may be prepared by the process of this invention.

Carbamates, heretofore unknown, of therapeutic hydroxy and mercapto compounds such as the carbamate of chloral hydrate which has sedative and hypnotic activity are conveniently prepared by this process. The carbamates of therapeutic hydroxy and mercapto compounds are advantageous because they often provide increased potency, decreased toxicity and eliminate undesirable taste and odor. This is of particular importance for mercapto containing compounds which are well known for their undesirable odoriferous properties.

It is an important feature of the present invention that the process is of general applicability in the preparation of carbamates. This process can be used to prepare the carbamates of mono and polyhydroxy and mono and polymercapto compounds; primary, secondary and tertiary alcohols and mercaptans; phenols and thiophenols. These hydroxy and mercapto compounds may possess other functional groups which do not react with the reagents of this process, such as olefins, ethers, sulfides and tertiary amines.

According to the process of this invention an organic compound which contains a X–H group in which X is oxygen or sulfur is reacted with an excess of an alkali metal cyanate or an alkali earth metal cyanate, preferably sodium cyanate, and an excess of trifluoroacetic acid. Preferably the hydroxy or mercapto compound is reacted with about 2–4 molar equivalents of sodium cyanate and about 2–4 molar equivalents of trifluoroacetic acid.

The reaction is run at temperatures of about 15–50° C. for about 2–24 hours preferably about 2–4 hours. Usually the reaction is carried out at room temperature for about two hours, there being little advantage in higher temperature or longer reaction time.

Conveniently the reaction is carried out in an organic solvent which is inert to the alkali metal or alkali earth metal cyanate used. Exemplary of suitable solvents are ethers such as diethyl ether, diisopropyl ether or tetrahydrofuran; hydrocarbons such as benzene or toluene; or halogenated hydrocarbons such as chloroform or carbon tetrachloride.

It is not necessary to run the reaction under anhydrous conditions, in fact it has been unexpectedly found that the yield of carbamate is somewhat reduced by the use of anhydrous conditions. The presence of a small amount of water in the reaction mixture is therefore advantageous.

The following examples are not limiting but are illustrative of the method in accordance with this invention. Various changes and modifications may be made in carrying out the process of this invention without departing from the spirit and scope thereof. Insofar as these changes and modifications are within the purview of the appended claims they are considered as part of our invention.

Example 1

A mixture of 4.0 g. of 3-methyl-3-pentanol, 5.2 g. of sodium cyanate, 9.1 g. of trifluoroacetic acid and 50 ml. of tetrahydrofuran is stirred at 45° C. for two hours then neutralized by the addition of solid sodium carbonate. The mixture is concentrated, treated with water and filtered to give 3-methyl-3-pentyl carbamate which has tranquilizing activity.

Example 2

To a mixture of 7.4 of t-butyl alcohol and 13.0 g. of sodium cyanate in diethyl ether and diisopropyl ether is added 22.9 g. of trifluoroacetic acid keeping the reaction mixture at room temperature. After two hours the mixture is neutralized by the addition of sodium carbonate, concentrated and the residue is treated with water and filtered to give t-butyl carbamate.

Example 3

To a mixture of 3.3 g. of 2-methyl-2-n-propyl-1,3-propanediol and 6.5 g. of sodium cyanate is added 11.4 g. of trifluoroacetic acid with cooling. Tetrahydrofuran (50 ml.) is added and the mixture is stirred for two hours. Neutralizing with sodium bicarbonate, concentrating and filtering the solid product gives 2-methyl-2-n-propyl-1,3-propanediol dicarbamate which has tranqualizing activity.

Example 4

To a mixture of 8.3 g. of chloral hydrate and 6.5 g. of sodium cyanate is added slowly 11.4 g. of trifluoroacetic acid while keeping the mixture in an ice bath. The resulting mixture is allowed to warm to room temperature and, after two hours, is treated with sodium carbonate and ether, then with water. The white precipitate is filtered off and recrystallized from aqueous ethanol to give chloral hydrate dicarbamate, M.P. 147° C. (dec.). This dicarbamate has sedative and hypnotic activity.

Example 5

A mixture of 9.5 g. of phenol, 13.0 g. of sodium cyanate and 22.8 g. of trifluoroacetic acid in ether is stirred at room temperature for 2.5 hours. The suspension is treated with excess sodium carbonate and filtered. The filtrate is concentrated and cooled in an ice bath. The white solid which forms is filtered off and recrystallized from water to give phenyl carbamate.

Example 6

To 9.0 g. of t-butylmercaptan and 13.0 g. of sodium cyanate in ether is added 22.8 g. of trifluoroacetic acid.

When the initial exothermic reaction subsides, the mixture is warmed to 45° C. and stirred for four hours. The resulting suspension is neutralized with sodium carbonate, diluted with ether, filtered and concentrated. Addition of water, filtration of the resulting white solid and recrystallization from petroleum ether gives t-butylthiol carbamate.

*Example 7*

A mixture of 5.5 g. of thiophenol, 8.2 g. of calcium cyanate and 11.4 g. of trifluoroacetic acid in 75 ml. of ether is stirred at room temperature for three hours. Working up as in Example 5 gives phenylthio carbamate.

*Example 8*

To a mixture of 7.4 g. of β,β,β-trichloroethanol and 6.5 of sodium cyanate in ether is added 11.4 g. of trifluoroacetic acid. The resulting mixture is stirred at 40° C. for 2.5 hours, then is treated with sodium carbonate, filtered and concentrated. Adding water and filtering gives β,β,β-trichloroethyl carbamate.

*Example 9*

A mixture of 4.0 g. of 2-chloro-10-[3-(N-hydroxyethyl-piperazinyl)propyl]phenothiazine, 1.3 g. of sodium cyanate and 2.3 g. of trifluoroacetic acid and 50 ml. of ether is stirred at 40° C. for two hours. Excess sodium carbonate is added and the mixture is filtered. Concentrating, adding water and filtering gives 10-[3-(N-carbamoyl-oxyethylpiperazinyl)propyl]-2-chlorophenothiazine.

*Example 10*

To a mixture of 13.8 g. of styrene glycol and 26.0 g. of sodium cyanate in diisopropyl ether is added 45.6 g. of trifluoroacetic acid. The resulting mixture is stirred at room temperature for three hours. Working up as in Example 9 gives a mixture of the mono and dicarbamate of styrene glycol.

*Example 11*

A mixture of 17.7 g. of β,β,β-trichloro-t-butyl alcohol, 16.2 g. of potassium cyanate, 22.8 g. of trifluoroacetic acid and 100 ml. of ether is stirred at room temperature for 2.5 hours. Adding sodium carbonate, filtering, concentrating, diluting with water and filtering gives β,β,β-trichloro-t-butyl carbamate having sedative activity.

What is claimed is:

1. The process of preparing carbamates of alcohols, mercaptans, phenols and thiophenols which comprises reacting "an organic compound which contains a X–H group in which X is a member selected from the group consisting of oxygen and sulfur" and with an excess of a member selected from the group consisting of an alkali metal cyanate and an alkali earth metal cyanate and an excess of trifluoroacetic acid at about 15–50° C.

2. The process according to claim 1 in which the reaction is carried out in an inert organic solvent.

3. The process according to claim 2 in which the reaction is carried out with sodium cyanate at 35–45° C. in an excess of aqueous trifluoroacetic acid.

4. The process of preparing 2-methyl-2-n-propyl-1,3-propanediol dicarbamate by reacting 2-methyl-2-n-propyl-1,3-propanediol with an excess of sodium cyanate and an excess of trifluoroacetic acid at about 25–30° C.

5. The process of preparing chloral hydrate carbamate by reacting chloral hydrate with an excess of sodium cyanate and an excess of trifluoroacetic acid.

6. The process of preparing 3-methyl-3-pentyl carbamate by reacting 3-methyl-3-pentanol with an excess of sodium cyanate and an excess of trifluoroacetic acid.

References Cited in the file of this patent

UNITED STATES PATENTS

| | | |
|---|---|---|
| 2,814,637 | Marshall | Nov. 26, 1957 |
| 2,878,158 | Stuehmen | Mar. 17, 1959 |

UNITED STATES PATENT OFFICE
CERTIFICATE OF CORRECTION

Patent No. 3,072,710                January 8, 1963

Minerva C. Flores et al.

It is hereby certified that error appears in the above numbered patent requiring correction and that the said Letters Patent should read as corrected below.

Column 4, lines 12 to 14, strike out ""an organic compound which contains a X-H group in which X is a member selected from the group consisting of oxygen and sulfur" and" and insert instead -- said alcohols, mercaptans, phenols and thiophenols --.

Signed and sealed this 2nd day of July 1963.

(SEAL)
Attest:

ERNEST W. SWIDER
Attesting Officer

DAVID L. LADD
Commissioner of Patents